Aug. 11, 1942.  E. A. McKEE  2,292,889
KITCHEN UTENSIL
Filed May 10, 1941
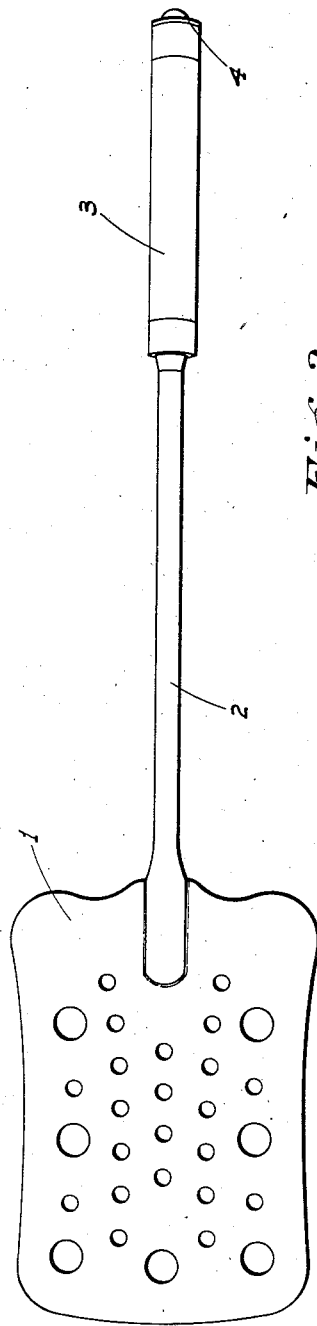
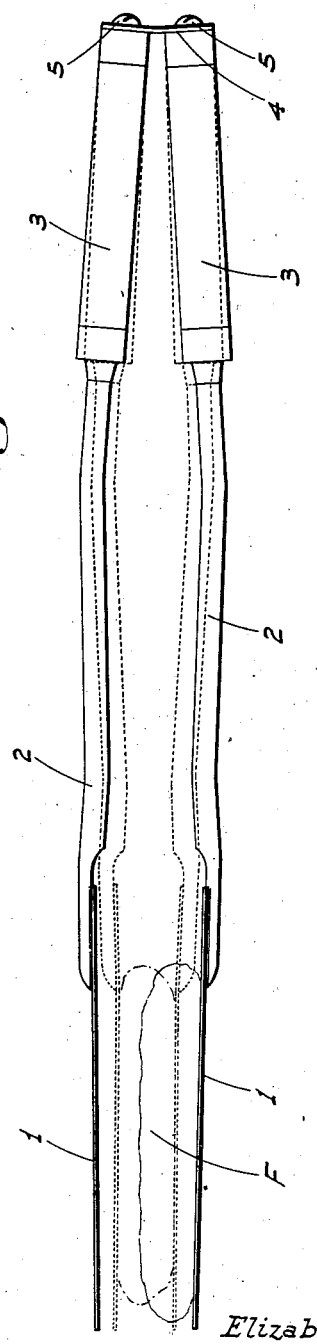
INVENTOR.
Elizabeth A. McKee
BY
ATTORNEYS Patented Aug. 11, 1942

2,292,889

UNITED STATES PATENT OFFICE 2,292,889

KITCHEN UTENSIL

Elizabeth A. McKee, Stockton, Calif.

Application May 10, 1941, Serial No. 392,890

4 Claims. (Cl. 294—7)

This invention relates in general to an improvement in kitchen utensils, and in particular the invention is directed to a food turner of novel construction.

Certain foods, such as flat cuts of fish, patties of meat, or vegetables, and certain other foods, when cooked in an open pan, tend to crumble or separate into pieces when turned with an ordinary one bladed food turner, which embodies no means to hold the food against such blade while the food is being turned over and redeposited on the pan.

It is therefore the principal object of this invention to provide a food turner which includes normally separated food engaging blades mounted for manually controlled approaching movement whereby to clamp the food to be turned therebetween, and to assure that the food cannot crumble or separate into pieces during the turning operation.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 of the drawing is a top plan view of my improved kitchen utensil.

Figure 2 is a side elevation of the utensil in normal position; the position of the parts of the utensil when engaged with food being shown in dotted lines.

Referring now more particularly to the characters of reference on the drawing, my improved kitchen utensil comprises a pair of flat, substantially rectangular blades 1 disposed in spaced face to face relation; such blades being perforate, of relatively thin material, and resilient. The blades are normally spaced apart a distance sufficient to permit the entry therebetween of the food to be turned.

Elongated rod-like handles 2 are fixed on plates 1 at one end thereof and project rearwardly; these rods being normally substantially the same distance apart as blades 1 when the latter are in normal position.

At their rear end handles 2 are formed or fitted with hand grips 3 which normally diverge from their rear ends forwardly, as shown in Fig. 2; the grips 3 at their rear end being connected by a relatively short leaf spring 4 which extends between and is secured to the ends of hand grips 3 by any suitable means such as screws 5. As will be noted, the leaf spring 4 is formed so as to normally maintain the hand grips 3 in the diverging relation previously described, and consequently to hold the blades 1 in their normally separated relation.

The resilient blades 1 when in normal position are slightly closer together at their forward ends than at their rearward ends so that when a piece of food F is disposed between such blades, the resilient blades upon manually actuated approaching movement, progressively engage the piece of food, assuring full holding contact therewith; the approaching movement of such blades being accomplished, of course, by manual squeezing on the hand grips 3 and against the tension of leaf spring 4.

With a piece of food thus clamped between the blades 1, the utensil may be turned over and the food redeposited on the cooking pan without the food crumbling or breaking. When the hand grips are released, the spring 4 returns the handles 2 and blades 1 to their normal and separated position.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A food turner comprising a pair of flat, food engaging blades, said blades being disposed in face to face relation and normally spaced apart, a pair of handles on and projecting from one end of said blades in spaced but alined relation, and means connecting said handles for swinging movement to and from each other whereby to effect corresponding movement of said blades; said means comprising a short leaf spring extending between and secured in connection with the rear end of said handles, the handles diverging for a certain distance from said rear end and thence extending substantially parallel to the blades, said diverging portions being fitted with hand grips.

2. A food turner comprising a pair of flat, resilient blades disposed in face to face relation and normally spaced apart, a pair of rigid handles secured on and projecting in alined but spaced relation from the blades at one end, a short leaf spring extending between and secured in connection with the ends of the handles remote from the blades, said spring yieldably resisting swinging movement of the handles in an approaching direction, and hand grips on the handles adjacent said spring.

3. A device as in claim 2 in which the portions of the handles engaged by said hand grips diverge relative to each other and from said spring.

4. A food turner comprising a pair of rigid substantially parallel handles normally spaced apart, longitudinal hand grips on each of said handles, said hand grips converging in the direction of their outer ends but terminating in spaced relation at said outer ends, a short spring member extending between and secured in connection with said outer ends of said hand grips, flat, food engaging blades secured on and projecting from the other end of the handles in face to face relation and normally spaced apart; said blades being resilient and normally closer together at their outer ends, whereby upon approaching movement, and after initial engagement therewith, said resilient blades progressively flex and engage a piece of food disposed therebetween.

ELIZABETH A. McKEE.